United States Patent
Hannuksela et al.

(10) Patent No.: US 8,619,868 B2
(45) Date of Patent: Dec. 31, 2013

(54) BACKWARD-COMPATIBLE CHARACTERIZATION OF AGGREGATED MEDIA DATA UNITS

(75) Inventors: Miska Hannuksela, Ruutana (FI); Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 891 days.

(21) Appl. No.: 12/036,100

(22) Filed: Feb. 22, 2008

(65) Prior Publication Data

US 2008/0205511 A1 Aug. 28, 2008

Related U.S. Application Data

(60) Provisional application No. 60/891,485, filed on Feb. 23, 2007.

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC ............ 375/240.25; 375/240.23; 375/240.24; 375/240.26; 375/241

(58) Field of Classification Search
USPC ................................................ 375/240–241
See application file for complete search history.

(56) References Cited

U.S. PATENT DOCUMENTS

| | | | |
|---|---|---|---|
| 2004/0218669 A1* | 11/2004 | Hannuksela | 375/240.01 |
| 2005/0008240 A1* | 1/2005 | Banerji et al. | 382/238 |
| 2005/0185719 A1* | 8/2005 | Hannuksela | 375/240.27 |
| 2007/0121722 A1* | 5/2007 | Martinian et al. | 375/240.12 |
| 2007/0201549 A1* | 8/2007 | Hannuksela et al. | 375/240.01 |
| 2008/0117985 A1 | 5/2008 | Chen et al. | |
| 2008/0137742 A1 | 6/2008 | Chen et al. | |
| 2008/0170616 A1* | 7/2008 | Hwang et al. | 375/240.16 |
| 2008/0205511 A1* | 8/2008 | Hannuksela et al. | 375/240.01 |

FOREIGN PATENT DOCUMENTS

WO WO 2005107253 A1 11/2005

OTHER PUBLICATIONS

"System and transport interface of H.264/AVC Scalable Extension"; Wang et al.; 2006 IEEE International Conference on Image Processing; published Oct. 8-11, 2006.*
Error resilient video coding using redundant pictures; Zhu et al.; 2006 IEEE International Conference on Image Processing; published Oct. 8-11, 2006.*
"RTP payload format for H.264 video; RFC 3984" to Wenger et al; IETF Standard, Internet Engineering Task, IETF; Feb. 2005.*
Office action for Singaporean Application No. 200905189-7 dated Aug. 6, 2010.
Notice of Preliminary Rejection from the Korean Intellectual Property Office, Feb. 16, 2011.

(Continued)

*Primary Examiner* — Benjamin H Elliott, IV
(74) *Attorney, Agent, or Firm* — Alston & Bird LLP

(57) ABSTRACT

A system and method for conveying information that is helpful for a network middlebox or a media player to decided which coded data units to forward or process within an RTP payload or a file format data unit in an easy-to-access manner. This mechanism can be used to provide indications of items such as redundant coded pictures, temporal level switching points, gradual decoding refresh access points, view identifiers, and view random access points. A middlebox and/or receiver can then use this information to determine whether certain coded data units need to be processed and/or transmitted.

10 Claims, 3 Drawing Sheets

(56) References Cited

OTHER PUBLICATIONS

English translation of Notice of Preliminary Rejection from the Korean Intellectual Property Office.

Vetro, A., et al. joint Draft 2.0 on Multiview Video Coding. Joint Video Team (JVT) of ISo/IEC MPEG & ITU-T VCEG, JVT-V209, 22nd Meeting: Marrakech, Morocco, Jan. 13-19, 2007.

Wenger et al. "RTP Payload Format for H.264 Video; rfc3984.txt" IETF Standard, Internet Engineering Task, IETF, CH. 1 Feb. 2005, XP015009755 ISSN: 0000-0003.

International Search Report of PCT/IB2008/050642.

Office Action for Russian Patent Application No. 2009134515/07(048616), dated Oct. 3, 2011.

English translation of Office Action for Russian Patent Application No. 2009134515/07(048616), dated Oct. 3, 2011.

Office Action in Chinese Patent Application 2008800049186, dated Nov. 9, 2011.

English translation of Office Action in Chinese Patent Application 2008800049186, dated Nov. 9, 2011.

Vetro, Anthony, et al.; "Joint Draft 1.0 on Multiview Video Coding"; Joint Video Team (JVT) of ISO/IEC MPEG & ITU-T VCEG (ISO/IEC JTC1/SC29/WG11 and ITU-T SG16 Q.6); $21^{st}$ Meeting: Hangzhou, China, Oct. 20-27, 2006; pp. 1-20.

Wenger, S., et al.; "RTP Payload Format for SVC Video"; Network Working Group; Internet Draft; dated Oct. 2006; pp. 1-40; downloaded from http://tools.ietf.org/html/draft-wenger-avt-rtp-svc-03.

Wenger, S., et al.; "RTP Payload Format for H.264 Video"; Network Working Group; dated Feb. 2005; pp. 1-90; downloaded from http://www.rfc-editor.org/rfc/rfc3984.txt.

Office Action from Russian Patent Application No. 2009134515/09(048616), dated May 12, 2010.

Office Action from Malaysian Patent Application No. PI 20093289, dated Jun. 29, 2012.

Office Action from Russian Patent Application No. 2009134515, dated Feb. 5, 2013.

Office Action from Chinese Patent Application No. 20088004918.6, dated Mar. 21, 2013.

U.S. Appl. No. 11/622,430, filed Jan. 11, 2007; first named inventor: Hannuksela.

U.S. Appl. No. 60/852,223, filed Oct. 16, 2006; first named inventor: Chen.

Office Action for Chinese Application No. 200880004918.6 dated Aug. 3, 2012.

\* cited by examiner

BACKWARD-COMPATIBLE CHARACTERIZATION OF AGGREGATED MEDIA DATA UNITS

CROSS-REFERENCE TO RELATED APPLICATIONS

The present application claims priority to U.S. Provisional Patent Application No. 60/891,485, filed Feb. 23, 2007.

FIELD OF THE INVENTION

The present invention relates generally video transport and storage. More particularly, the present invention relates to the provision of information to assist a unit in deciding which coded data units should be forwarded or processed.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Advanced Video Coding (AVC), also know as H.264/AVC, is a video coding standard developed by the Joint Video Team (JVT) of ITU-T Video Coding Expert Group (VCEG) and ISO/IEC Motion Picture Expert Group (MPEG). AVC includes the concepts of a Video Coding Layer (VCL) and a Network Abstraction Layer (NAL). The VCL contains the signal processing functionality of the codec—mechanisms such as transform, quantization, motion-compensated prediction, and loop filters. A coded picture consists of one or more slices. The NAL encapsulates each slice generated by the VCL into one or more NAL units. A NAL unit is comprised of a NAL unit header and a NAL unit payload. The NAL unit header contains, among other, the NAL unit type indicating whether the NAL unit contains a coded slice, a coded slice data partition, a sequence or picture parameter set, and so on. A NAL unit stream is simply a concatenation of a number of NAL units. An encoded bitstream according to H.264/AVC or its extensions, e.g. SVC, is either a NAL unit stream, or a byte stream by prefixing a start code to each NAL unit in a NAL unit stream.

Scalable Video Coding (SVC) provides scalable video bitstreams. A scalable video bitstream contains a non-scalable base layer and one or more enhancement layers. An enhancement layer may enhance the temporal resolution (i.e. the frame rate), the spatial resolution, or the quality of the video content represented by the lower layer or part thereof. In the SVC extension of AVC, the VCL and NAL concepts were inherited.

Multi-view Video Coding (MVC) is another extension of AVC. An MVC encoder takes input video sequences (called different views) of the same scene captured from multiple cameras and outputs a single bitstream containing all the coded views. MVC also inherited the VCL and NAL concepts.

Real-time Transport Protocol (RTP) is widely used for real-time transport of timed media such as audio and video. In RTP transport, media data is encapsulated into multiple RTP packets. A RTP payload format for RTP transport of AVC video is specified in IETF Request for Comments (RFC) 3984, which is available from www.rfc-editor.org/rfc/rfc3984.txt and the contents of which are incorporated herein by reference. For AVC video transport using RTP, each RTP packet contains one or more NAL units.

IETF RFC 3984 specifies several packetization modes, one of which is an interleaved mode. If the interleaved packetization mode is in use, then NAL units from more than one access units can be packetized into one RTP packets. RFC 3984 also specifies the concept of decoding order number (DON) that indicates the decoding orders of a NAL units conveyed in an RTP stream.

In the SVC RTP payload format draft, Internet-Draft in draft-wenger-avt-rtp-svc-03 (available from http://www.tools.ietforg/html/draft-wenger-avt-rtp-svc-03), a new NAL unit type, referred to as a payload content scalability information (PACSI) NAL unit, is specified. The PACSI NAL unit, if present, is the first NAL unit in an aggregation packet, and it is not present in other types of packets. The PACSI NAL unit indicates scalability characteristics that are common for all of the remaining NAL units in the payload, thus making it easier for a media aware network element (MANE) to decide whether to forward/process/discard the aggregation packet. Senders may create PACSI NAL units. Receivers may ignore PACSI NAL units or use them as hints to enable the efficient aggregation packet processing. When the first aggregation unit of an aggregation packet contains a PACSI NAL unit, there is at least one additional aggregation unit present in the same packet. The RTP header fields are set according to the remaining NAL units in the aggregation packet. When a PACSI NAL unit is included in a multi-time aggregation packet, the decoding order number for the PACSI NAL unit is set to indicate that the PACSI NAL unit is the first NAL unit in decoding order among the NAL units in the aggregation packet, or the PACSI NAL unit has an identical decoding order number to the first NAL unit in decoding order among the remaining NAL units in the aggregation packet.

Decisions as to which NAL units should be transmitted and/or processed are generally required for several different purposes. For example, in multipoint real-time communication systems, e.g., multiparty video conferencing, the sender(s) may not know the capabilities of all receivers, e.g., when the number of receivers is large or when receivers can join the multipoint session without notification to the sender(s). If possible, the senders should not be limited according to the capabilities of the weakest receiver, as that limits the quality of experience that can be provided to other receivers. Consequently, it would be beneficial if a middlebox, such as a multipoint control unit (MCU) in multimedia conferencing, could efficiently adjust the forwarded streams according to the receiver capabilities.

Another situation in which such decisions should be made involves when a file is played back in a device or with software that is capable of decoding a subset of the stream only, such as the H.264/AVC compliant base layer or view of SVC or MVC bitstreams, respectively. Only the subset of the NAL units therefore needs to be processed. The video data to be played back by the media player may be in the format according to a file format container or in the format of an RTP stream. In any of the two cases, easy access of all the information that is helpful to decide which NAL units to be processed by the media player is desirable.

The SVC file format draft standard, referred to as MPEG document N8663, supports aggregation of multiple NAL units into one aggregator NAL unit. This is expected to be supported in the future MVC file format as well. Aggregator NAL units can both aggregate by inclusion NAL units within them (within the size indicated by their length) and also aggregate by reference NAL units that follow them (within the area indicated by the additional bytes field within them). When the stream is scanned by an AVC file reader, only the included NAL units are seen as "within" the aggregator. This permits, for example, an AVC file reader to skip a whole set of unneeded SVC or MVC NAL units. SVC NAL units refer to the SVC specific NAL units for which the NAL unit type values are reserved by the AVC specification. MVC NAL units refer to the MVC specific NAL units for which the NAL unit type values are reserved by the AVC specification. Similarly, if AVC NAL units are aggregated by reference, the AVC reader will not skip them and they remain in-stream for that reader. This aggregation mechanism adds complexities in accessing information needed to decide which NAL units to process by a media player.

Yet another situation in which such decisions should be made involves when an end-user receiving a scalable or multi-view stream decides to switch the layers or views, respectively, that he or she wants to decode and render. A corresponding request is transmitted via Session Identification Protocol (SIP) or Real-Time Streaming Protocol (RTSP), for example. As a response, the recipient of the request, such as a server or a middlebox, is supposed to select the layers or views that are forwarded. Due to inter-layer and inter-view prediction, immediate changes in the transmitted layers or views may not be desirable because (1) the resulting streams may not be standard-compliant, as some inter-layer and inter-view references may not be present in the decoder; (2) some of the transmitted data may not be decodable and hence not useful for the receivers; and (3) the non-decodable data wastes bitrate in the channel and may cause congestion and packet loss as well as increase transmission delay. The transmitter should therefore respond to the request from the next possible layer-switch or view-switch position.

Additionally, it is noted that redundant pictures provide a mechanism for a system to recover from transmission errors when corresponding primary coded pictures are damaged. The transmission of redundant pictures is unnecessary, however, if the redundant pictures themselves cannot be correctly decoded, the corresponding primary coded pictures are correctly decodable, or the decoding of redundant pictures is not supported in the receiver. A sender or a middlebox may therefore omit the transmission of redundant pictures or part thereof in the several cases. A first such case involves when the reference pictures for redundant pictures are not correctly decoded. This can be concluded e.g. from generic NACK feedback of RTP/AVPF or slice loss indication feedback of RTP audio-Visual Profile With Feedback (RTP/AVPF). A second case is when a redundant picture is not integral when it arrives a middlebox, i.e. a slice of a redundant picture is lost in the channel between a sender and a middlebox. This can be concluded in the middlebox, e.g. based on RTP sequence numbers of incoming packets and the content of the previous and subsequent RTP packet of the lost one. A third case is when a reliable communication protocol is used for transmission, when there is sufficient time for selective retransmissions of damaged primary coded pictures, or when network conditions are detected to be loss-free. A fourth such condition is when a receiver signals that no redundant pictures are supported—either implicitly via supported profiles or explicitly with the redundant-pic-cap MIME/SDP parameter, for example.

Still another situation in which decisions as to which NAL units should be transmitted and/or processed such decisions can be made involves when bitrate adaptation is required to trim the transmitted bitrate according to the throughput of a bottleneck link, for congestion avoidance, or for adjustment of network or client buffers. In this case, the sender or the middlebox should make a sophisticated decision which NAL units are not transmitted. One function of media-aware gateways or RTP mixers (which may be multipoint conference units, gateways between circuit-switched and packet-switched video telephony, PoC servers, IP encapsulators in DVB-H system, or set-top boxes that forward broadcast transmissions locally to home wireless network, for examples) is to control the bitrate of the forwarded stream according to prevailing downlink network conditions. It is desirable to control the forwarded data rate without extensive processing of the incoming data, i.e. by simply dropping packets or easily identified parts of packets.

When using the non-interleaved and interleaved packetization modes of H.264/AVC and SVC RTP payload formats, some of the common characteristics of the NAL units contained in the packet can only be identified when each contained NAL unit is examined. The examination may require partial decoding of the NAL unit. For example, the sub-sequence information SEI message should be decoded in order to find temporal level switching points and the slice header has to be decoded to find out if a coded slice belongs to a primary coded picture or a redundant coded picture.

Middleboxes should usually drop entire pictures or picture sequences so that the resulting stream remains valid. The interleaved packetization mode of H.264/AVC RTP payload specification allows encapsulation of practically any NAL units of any access units into the same RTP payload (called aggregation packet). In particular, it is not required to encapsulate entire coded pictures in one RTP payload, but rather the NAL units of a coded picture can be split into multiple RTP packets. While this liberty is helpful for many applications, it causes the following complications in a middlebox operation. First, given an aggregation packet, it is not known to which pictures its NAL units belong to before parsing the header of each NAL unit contained in the aggregation packet. Thus, when the interleaved packetization mode is applied, each aggregation unit header and NAL unit header should be parsed to map them to correct pictures. When redundant pictures are present, parsing into slice headers are further required. Second, it may not be possible to identify a characteristic of a NAL unit without the presence of some other NAL units of the same access unit. For example, in order to find out if a coded slice is part of an access unit that can be randomly accessed, the recovery point SEI message for the access unit must first be received and decoded.

Therefore, there is a need to provide easily accessible information in transport packets or file format aggregation NAL units based on which a network middlebox or a media player can decide which coded data units to be transmitted and/or processed. U.S. patent application Ser. No. 11/622,430, filed Jan. 11, 2007 and incorporated herein by references, discloses an indirect aggregator NAL unit for the SVC file format and the RTP payload format to indicate the scalability characteristics of certain NAL units following the indirect aggregator NAL unit. However, characteristics beyond scalability information for SVC were not considered, including whether the coded data units contained in the transport packet are (1) parts of redundant pictures, 2) parts of temporal layer switching points, (3) parts of view random access points, (4) parts of random access points that are not instantaneous decoding refresh (IDR) pictures, and 5) parts of pictures of a certain view identified by a view identifier.

SUMMARY OF THE INVENTION

Various embodiments of the present invention provide a system and method for conveying information that is helpful for a network middlebox or a media player to decided which coded data units to forward or process within an RTP payload or a file format data unit in an easy-to-access manner. In various embodiments of the present invention, this mechanism can be used to provide indications of items such as redundant coded pictures, temporal level switching points, gradual decoding refresh access points, view identifiers, and view random access points. A middlebox and/or receiver can then use this information to determine whether certain coded data units need to be processed and/or transmitted. Additionally, indications of items such as random access points for non-layered single-view bitstreams and picture type indications may also be provided.

Various embodiments provide a method, computer program product and apparatus for packetizing an encoded representative of a video sequence, wherein a plurality of data units are packetized into a first packet. A first data unit of the plurality of data units comprises at least a portion of the encoded bitstream, and a second data unit of the plurality of data units comprises information summarizing the contents of the portion of the encoded video. The second data unit is placed before any of the other data units of the plurality of data units in the first packet.

Various embodiments provide a method, computer program product and apparatus for processing a packetized bitstream representative of a video sequence. A plurality of data units are read from a first packet, wherein a first data unit of the plurality of data units comprises at least a portion of the encoded bitstream and a second data unit of the plurality of data units comprises information summarizing the contents of the portion of the encoded video. The second data unit is located before any of the other data units of the plurality of data units in the first packet. The plurality of data units are then processed based upon information contained within the second data unit.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
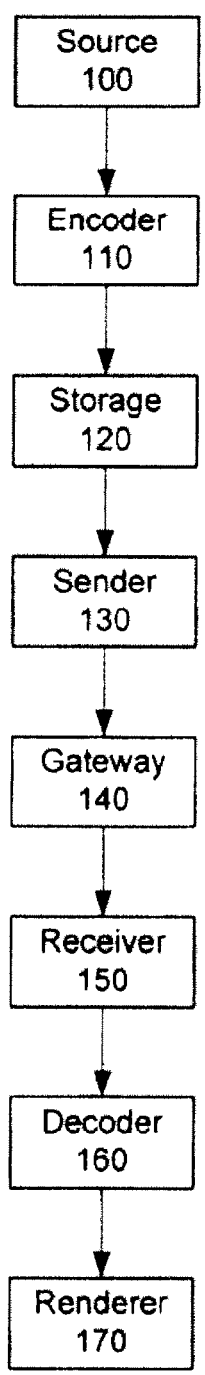
FIG. 1 shows a generic multimedia communications system for use with the present invention.

Various embodiments of the present invention provide a system and method for conveying information that is helpful for a network middlebox or a media player to decide which coded data units to forward or process within an RTP payload or in a file format data unit in an easy-to-access manner. In various embodiments of the present invention, this mechanism can be used to provide indications of at least the following items:

Indication of Redundant Coded Pictures.

This indication can be accompanied with a list of reference pictures required for decoding of the aggregated redundant coded slices and indication of the spatial coverage of the aggregated redundant coded slices. There are times where slices of only one redundant coded picture would be aggregated and characterized.

Indication of Temporal Level Switching Points.

Starting from a temporal level switching point, the decoder can correctly decode all of the following coded pictures with the same temporal level, if before the temporal level switching point only pictures of lower temporal levels were decoded. This indication can be accompanied with a list of reference pictures, indicated by the values of frame_num, for example, that should be correctly decoded in order to enable the switch of temporal levels. It is noted that dropping the number of decoded/forwarded temporal levels is typically possible at any point.

Indication of Gradual Decoding Refresh Access Points.

If the decoder starts decoding from such a point, then the picture contents will be gradually corrected over a number of consecutive pictures. In certain embodiments, this indication should be accompanied with a count on pictures or packets whose decoding is required for achieving pictures that are correct in content.

Indication of Views.

This indication signals the views (in terms of view IDs, for example) to which the aggregated NAL units belong.

Indication of View Random Access Pictures.

Due to inter-view prediction, it is not possible to start the decoding of a view at arbitrary points. This indication is therefore used to signal that the decoder can start decoding from this position. The indication may be accompanied with a count on pictures or packets whose decoding is required for achieving pictures that are correct in content. Different types of view random access points are discussed in U.S. Provisional Patent Application No. 60/852,223, filed Oct. 16, 2006 and incorporated herein by reference.

In various embodiments of the present invention, the indirect NAL unit aggregation mechanism discussed in U.S. patent application Ser. No. 11/622,430 is used as the mechanism to convey the above indications. Additionally, this same aggregation mechanism can also be used for other indications as well. For example, this mechanism may also be used for random access point indications (open and closed groups of pictures (GOP)) for non-layered single-view bitstreams and picture type indications (e.g. intra picture, non-reference picture).

The following is one implementation of various embodiments of the present invention, specifically with regard to the RTP payload format of SVC and MVC. In this implementation, the payload content scalability information (PACSI) NAL unit discussed in U.S. patent application Ser. No. 11/622,430 is extended to contain additional types of information. The header of the PACSI NAL unit is kept unchanged. Alternatively, the PACSI NAL unit header may be modified to match the upcoming MVC NAL unit header, especially if the upcoming MVC NAL unit header is a superset of the SVC NAL unit header. The current draft of the MVC NAL unit header is available in the draft output of the October 2006 JVT meeting (available from http://ftp3.itu.ch/av-arch/jvt-site/2006_10_Hangzhou/JVT-U209.zip and incorporated herein by reference), in the nal_unit_header_svc_mvc_extension syntax structure. Alternatively, another NAL unit type, such as value 31, may be used for indicating the information described herein.

The following is an example of the PACSI NAL unit in the context of an exemplary RTP payload format for SVC and MVC jointly.

The PACSI NAL unit consists of a 1-byte NAL unit header, a 1-byte content information (CI) header and a varying-length CI payload. The 1-byte NAL unit header contains the F, NRI and Type fields as specified below.

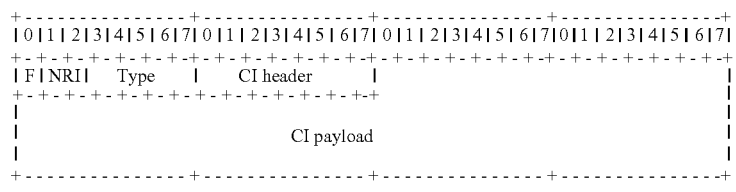

The values of the fields in PACSI NAL unit are set as follows. The F bit is set to 1 if the F bit in at least one remaining NAL unit in the payload is equal to 1. Otherwise, the F bit is set to 0. The NRI field is set to the highest value of NRI field among all of the remaining NAL units in the payload. The Type field is set to 30.

The CI header contains flags to indicate the presence of different types of content information as follows:

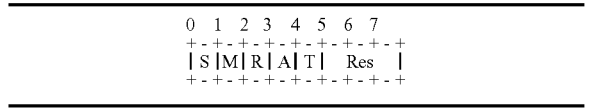

The S bit equal to 1 indicates the presence of content scalability information specified identically the Internet-Draft in draft-wenger-avt-rtp-svc-03 (available at www.tools.ietf.org/html/draft-wenger-avt-rtp-svc-03 and incorporated herein by reference) and copied below:

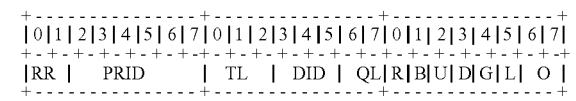

When the M bit is equal to 1, the following multi-view content information is present in the CI payload:

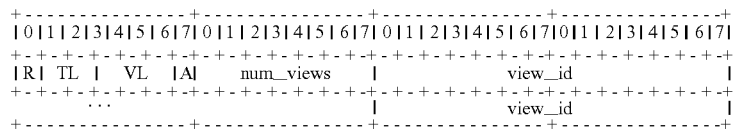

The R bit is reserved. TL (temporal level) is set to the lowest value of the TL field among the remaining NAL units in the RTP payload. VL (view level) is set to the lowest value of the VL field among the remaining NAL units in the RTP payload.

A (anchor_pic_flag) is set to the highest value of the A field among the remaining NAL units in the RTP payload. Consequently, an A bit value equal to 1 indicates that the RTP payload contains at least one NAL unit associated to an anchor picture. An A bit value equal to 0 indicates that the RTP payload contains no NAL unit associated to an anchor picture.

num_views indicates the number of the following view_id syntax elements. num_views is set to the value that indicates the number of different values of the view_id among the remaining NAL units in the RTP payload.

Each value of view_id indicates a view_id present among the remaining NAL units in the RTP payload. Values of view_id must not be duplicated in the CI payload. Currently, the values of view_id in the MVC specification are 10-bit unsigned integers, which are converted to 16-bit unsigned integers for the CI payload.

In one embodiment of the invention, the num_views field is not present, and only one value of view_id is included in the multi-view content information. Consequently, it is required that an RTP packet including a PACSI NAL unit contains coded data from only one view.

The R bit of the CI header indicates the presence of redundant coded picture information. When the R bit is equal to 1, the RTP payload does not contain any NAL units for primary coded pictures. No CI payload corresponding to the R bit is present.

The A bit of the CI header indicates the presence of a random access point as follows. When the A bit is equal to 1, the S bit is equal to 0 and the M bit is equal to 0, the RTP payload contains a NAL unit belonging to an IDR picture or an intra picture associated to a recovery point SEI message with the value of recovery_frame_cnt syntax element equal to 0. When the A bit and the S bit are equal to 1, the RTP payload contains a NAL unit belonging to an IDR picture of SVC. When the A bit and the M bit are equal to 1, the RTP payload contains a NAL unit belonging to a view random access picture (an IDR picture or an anchor picture) of MVC.

The T bit of the CI header indicates the presence of a temporal level switching point. When the T bit is equal to 1, either the S bit or the M bit must also be equal to 1. When the T bit is equal to 1, the following temporal level information is present in the CI payload:

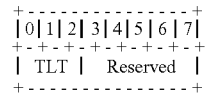

The TLT syntax element indicates the temporal level that can be switched to if all packets containing temporal levels equal to or lower than TLT are decoded from this point on, when the temporal level (TLT-1) was previously decoded at least since the previous temporal level switch point for temporal level (TLT-1) in transmission order. Alternatively, it is possible to include multiple TLT values to indicate the multiple temporal_level values that can be switched to under the same condition as above.

The bits of the Reserved field are reserved. The bits of the Res field in the CI header are also reserved. When more than one of the non-reserved bits in the CI header are set to 1, the CI payload syntax structures appear in the order that the corresponding bits appear in the CI header.

The following is another implementation of various embodiments of the present invention, specifically with regard to the RTP payload format of SVC. In this implementation, the payload content scalability information (PACSI) NAL unit discussed in U.S. patent application Ser. No. 11/622,430 is extended by adding one more octet as follows.

```
+-+-+-+-+-+-+-+-+
|0|1|2|3|4|5|6|7|
+-+-+-+-+-+-+-+-+
|R|T|D|I|  RES  |
+-+-+-+-+-+-+-+-+
```

The R field is set to 1 if all the coded pictures containing the target NAL units are anchor pictures. Otherwise, the bit R is be set to 0. The target NAL units are such NAL units contained in the aggregation packet, but not included in the PACSI NAL unit, that are within the access unit to which the first NAL unit following the PACSI NAL unit in the aggregation packet belongs. An anchor picture is such a picture that, if decoding of the layer starts from the picture, all the following pictures of the layer, in output order, can be correctly decoded. Note that anchor pictures are random access points to the layers the anchor pictures belong to. However, some pictures succeeding an anchor picture in decoding order but preceding the anchor picture in output order may refer to earlier pictures hence may not be correctly decoded, if random access is performed at the anchor picture.

The T field is set to 1 if all the coded pictures containing the target NAL units (as defined above) are temporal scalable layer switching points. Otherwise, the bit T is set to 0. For a temporal scalable layer switching point, all of the coded pictures with the same value of temporal_level at and after the switching point in decoding order do not refer to any coded picture with the same value of temporal_level preceding the switching point in decoding order.

The D field is set to 1 if all the coded pictures containing the target NAL units (as defined above) are redundant pictures. Otherwise, the D field is set to 0. The I field is set to 1 if the picture that has the greatest value of dependency_id among all the coded pictures containing the target NAL units (as defined above) is an intra coded picture, i.e., the coded picture does not refer to any earlier coded picture in decoding order in the same layer. The RES field is set to 0.

It is further possible not to convey the fields for the indications in the PACSI NAL unit, but directly add them in the payload structure before any NAL unit in the RTP packet.

For SVC and MVC file formats, the indications can be conveyed by additional fields within the aggregator NAL units. In different embodiments, additional fields and their semantics of the proposed aggregator NAL unit are similar to the fields of the semantics of the PACSI NAL unit in the different embodiments described above.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bit stream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bit streams of synthetic media. In the following, only processing of one coded media bit stream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

It should be understood that, although text and examples contained herein may specifically describe an encoding process, one skilled in the art would readily understand that the same concepts and principles also apply to the corresponding decoding process and vice versa.

The coded media bit stream is transferred to a storage 120. The storage 120 may comprise any type of mass memory to store the coded media bit stream. The format of the coded media bit stream in the storage 120 may be an elementary self-contained bit stream format, or one or more coded media bit streams may be encapsulated into a container file. Some systems operate "live", i.e. omit storage and transfer coded media bit stream from the encoder 110 directly to a sender 130. The coded media bit stream is then transferred to the sender 130, also referred to as the server, on a need basis. The format used in the transmission may be an elementary self-contained bit stream format, a packet stream format, or one or more coded media bit streams may be encapsulated into a container file. The encoder 110, the storage 120, and the sender 130 may reside in the same physical device or they may be included in separate devices. The encoder 110 and the sender 130 may operate with live real-time content, in which case the coded media bit stream is typically not stored permanently, but rather buffered for small periods of time in the content encoder 110 and/or in the sender 130 to smooth out variations in processing delay, transfer delay, and coded media bitrate.

The sender 130 sends the coded media bit stream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bit stream into packets. For example, when RTP is used, the sender 130 encapsulates the coded media bit stream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bit stream. The codec media bit stream is typically processed further by a decoder 160, whose output is one or more uncompressed media streams. Finally, a renderer 170 may reproduce the uncompressed media streams with a loudspeaker or a display, for example. The receiver 150, the decoder 160, and the renderer 170 may reside in the same physical device or they may be included in separate devices.

It should be noted that the bit stream to be decoded can be received from a remote device located within virtually any type of network. Additionally, the bit stream can be received from local hardware or software.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
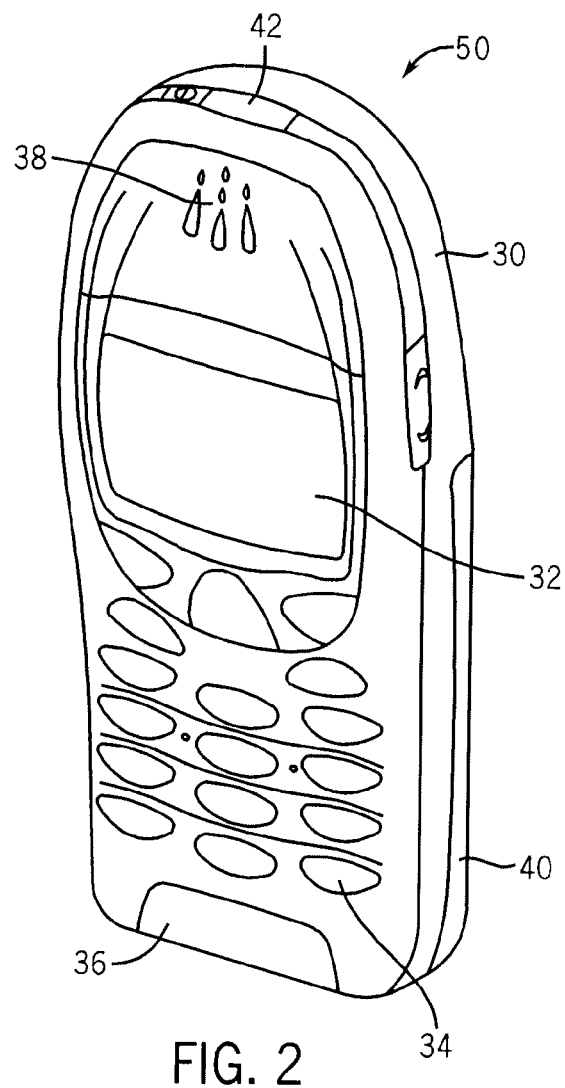
FIG. 2 is a perspective view of an electronic device that can be used in the implementation of the present invention.
Figure 3:
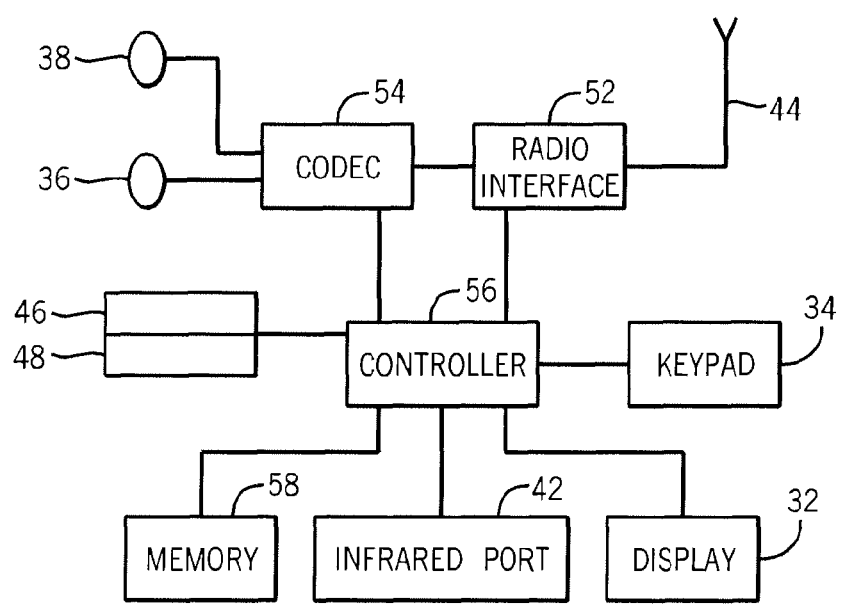
FIG. 3 is a schematic representation of the device circuitry of the electronic device of FIG. 2.

FIGS. 2 and 3 show one representative electronic device 50 within which the present invention may be implemented. It should be understood, however, that the present invention is not intended to be limited to one particular type of device. The electronic device 50 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
packetizing a plurality of data units into a Real-Time Transport Protocol (RTP) packet for real-time transport of a video sequence,
wherein a first data unit of the plurality of data units comprises at least a portion of an encoded bitstream, wherein a second data unit of the plurality of data units comprises information summarizing the contents of the portion of the encoded bitstream, and wherein the second data unit is placed before any of the other data units of the plurality of data units in the RTP packet;
providing, in the second data unit, an indication indicative of a characteristic of the encoded bitstream representative of a the video sequence, wherein the indication comprises at least one of:
an indication of redundant coded pictures within the plurality of data units;
an indication of temporal level switching points within the plurality of data units;
an indication of gradual decoding access points within the plurality of data units;
an indication of views to which the plurality of data units belong; or an indication of view random access pictures within the plurality of data units; and transmitting the plurality of data units, including the first data unit and the second data unit, in accordance with the Real-Time Transport Protocol.

2. The method of claim 1, further comprising providing, in the second data unit, an indication indicative of a characteristic that is common to all of the plurality of data units.

3. A computer program product, embodied in a non-transitory computer-readable medium, comprising computer code for performing the processes of claim 1.

4. An apparatus, comprising:
a processor; and
a memory unit communicatively connected to the processor and including
computer code for packetizing a plurality of data units into a Real-Time Transport Protocol (RTP) packet for real-time transport of the video sequence,
wherein a first data unit of the plurality of data units comprises at least a portion of an encoded bitstream, wherein a second data unit of the plurality of data units comprises information summarizing the contents of the portion of the encoded bitstream, and wherein the second data unit is placed before any of the other data units of the plurality of data units in the RTP packet; and
computer code for providing, in the second data unit, an indication indicative of a characteristic of the encoded bitstream representative of the video sequence, wherein the indication comprises at least one of:
an indication of redundant coded pictures within the plurality of data units;
an indication of temporal level switching points within the plurality of data units;
an indication of gradual decoding access points within the plurality of data units;
an indication of views to which the plurality of data units belong; or
an indication of view random access pictures within the plurality of data units; and
computer code for transmitting the plurality of data units, including the first data unit and the second data unit, in accordance with the Real-Time Transport Protocol.

5. The apparatus of claim 4, wherein the memory unit further comprises computer code for providing, in the second data unit, an indication indicative of a characteristic that is common to all of the plurality of data units.

6. A method comprising:
reading a plurality of data units from a Real-Time Transport Protocol (RTP) packet received in real-time transport of a video sequence, wherein a first data unit of the plurality of data units comprises at least a portion of an encoded bitstream, wherein a second data unit of the plurality of data units comprises information summarizing the contents of the portion of the encoded bitstream, and wherein the second data unit is located before any of the other data units of the plurality of data units in the RTP packet;

retrieving, from the second data unit, an indication indicative of a characteristic of the encoded bitstream representative of the video sequence, wherein the indication comprises at least one of:
an indication of redundant coded pictures within the plurality of data units;
an indication of temporal level switching points within the plurality of data units;
an indication of gradual decoding access points within the plurality of data units;
an indication of views to which the plurality of data units belong; or
an indication of view random access pictures within the plurality of data units; and
processing the plurality of data units, including the first data unit and the second data unit, based upon information contained within the second data unit.

7. The method of claim 6, wherein the second data unit includes an indication indicative of a characteristic that is common to all of the plurality of data units.

8. A computer program product, embodied in a non-transitory computer-readable medium, comprising computer code for performing the processes of claim 6.

9. An apparatus, comprising:
a processor; and
a memory unit communicatively connected to a processor and including:
computer code for reading a plurality of data units from a Real-Time Transport Protocol (RTP) packet received in real-time transport of the video sequence, wherein a first data unit of the plurality of data units comprises at least a portion of an encoded bitstream, wherein a second data unit of the plurality of data units comprises information summarizing the contents of the portion of the encoded bitstream, and wherein the second data unit is located before any of the other data units of the plurality of data units in the RTP packet;
computer code for retrieving, from the second data unit, an indication indicative of a characteristic of the encoded bitstream representative of the video sequence, wherein the indication comprises at least one of:
an indication of redundant coded pictures within the plurality of data units;
an indication of temporal level switching points within the plurality of data units;
an indication of gradual decoding access points within the plurality of data units;
an indication of views to which the plurality of data units belong; or
an indication of view random access pictures within the plurality of data units; and
computer code for processing the plurality of data units, including the first data unit and the second data unit, based upon information contained within the second data unit.

10. The apparatus of claim 9, wherein the second data unit includes an indication indicative of a characteristic that is common to all of the plurality of data units.

* * * * *